United States Patent
Okada et al.

(10) Patent No.: US 7,734,774 B2
(45) Date of Patent: Jun. 8, 2010

(54) IN-OPERATION SYSTEM CHECK PROCESSING DEVICE, METHOD, AND PROGRAM THEREOF

(75) Inventors: Toshiro Okada, Kawasaki (JP); Toshiya Yamazaki, Kawasaki (JP); Takao Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 11/976,621

(22) Filed: Oct. 25, 2007

(65) Prior Publication Data

US 2008/0109548 A1  May 8, 2008

(51) Int. Cl.
G06F 15/173 (2006.01)

(52) U.S. Cl. .................. 709/224; 709/223; 714/39; 714/47

(58) Field of Classification Search .................. 709/224, 709/223; 714/39, 47
See application file for complete search history.

(56) References Cited

U.S. PATENT DOCUMENTS 7,076,543 B1 * 7/2006 Kirti et al. ............... 709/223
7,080,141 B1 * 7/2006 Baekelmans et al. ....... 709/224

FOREIGN PATENT DOCUMENTS

| JP | 5-225104 | 9/1993 |
| JP | 7-87088 | 3/1995 |
| JP | 7-319930 | 12/1995 |
| JP | 2002-215699 | 8/2002 |
| JP | 2004-86729 | 3/2004 |

OTHER PUBLICATIONS

International Preliminary Report on Patentability issued in corresponding International Patent Application No. PCT/JP2005/007772, mailed on Nov. 8, 2007.
International 'Search Report (PCT/ISA/210) of International Application PCT/JP2005/007772 (mailed on Aug. 9, 2005).

* cited by examiner

Primary Examiner—Wing F Chan
Assistant Examiner—Ruolei Zong
(74) Attorney, Agent, or Firm—Staas & Halsey LLP

(57) ABSTRACT

In an in-operation system check processing device, an automatic exploration unit automatically checks presence/absence of devices of the in-operation system and relationship between the devices according to the design data of the in-operation system. A check list storage unit contains information on check conditions concerning problems of the devices constituting a network system found afterward. A system check unit detects a problem existing in the actual in-operation system by collating the design data and the result of the automatic exploration with the check conditions stored in the check list storage unit. A caution information output unit outputs caution information relating to the problem. Thus, it is possible to prevent a failure which may be caused in the in-operation system with a high probability and improve the operation quality.

7 Claims, 23 Drawing Sheets

Fig.8

DEVICE TABLE 22

| ID | NAME | MODEL | Ver. | IP RELAY | IP ADDRESS | HOST NAME etc. | EXPLO RATION | IDENTIFI-CATION |
|---|---|---|---|---|---|---|---|---|
| 1 | terminal | term1 | 1 | × | ANY | | × | × |
| 2 | external service | svc1 | 1 | × | 10.0.0.1/24 | | × | × |
| 3 | internet | Internet | 1 | O | | | × | × |
| 4 | NIC104 | NICFW | 1 | O | 10.1.0.1/24 | | O | × |
| 5 | FireWall | FW1 | 1 | O | | FireWall | O | Host name |
| 6 | NIC106 | NICFW | 1 | O | 192.168.2.1/24 | | O | × |
| 7 | LAN cable | CBL1 | 1 | O | | | × | × |
| 8 | Port 108 | PT1 | 1 | O | | | O | × |
| 9 | HUB109 | HUB123 | 1 | O | 192.168.2.5/24 | | O | Host name |
| 10 | Port 110 | PT1 | 1 | O | | | O | × |
| 11 | Port 111 | PT1 | 1 | O | | | O | × |
| 12 | Port 112 | PT1 | 1 | O | | | O | × |
| 13 | LAN cable | CBL1 | 1 | O | | | × | × |
| 14 | NIC114 | NICSV | 1 | O | 192.168.2.2/24 | | O | × |
| 15 | ADMIN server | SVR1 | 1 | O | | ADMIN | O | Host name |
| 16 | NIC116 | NICSV | 1 | O | 192.168.1.2/24 | | O | × |
| 17 | LAN cable | CBL1 | 1 | O | | | × | × |
| 18 | Port 118 | PT1 | 1 | O | | | O | × |
| 19 | HUB119 | HUB123 | 1 | O | 192.168.1.5/24 | | O | × |
| 20 | Port 120 | PT1 | 1 | O | | | O | × |
| 21 | Port 121 | PT1 | 1 | O | | | O | × |
| 22 | Port 122 | PT1 | 1 | O | | | O | × |
| 23 | LAN cable | CBL1 | 1 | O | | | × | × |
| 24 | NIC124 | NICSV | 1 | O | 192.168.1.6/24 | | O | × |
| 25 | DB server | SVR3 | 1 | O | | DB | O | Host name |
| 26 | LAN cable | CBL1 | 1 | O | | | × | × |
| 27 | NIC127 | NICSV | 1 | O | 192.168.2.3/24 | | O | × |
| 28 | WWW server | SVR2 | 1 | × | | WWW1 | O | Host name |
| 29 | NIC129 | NICSV | 1 | O | 192.168.1.3/24 | | O | × |
| 30 | LAN cable | CBL1 | 1 | O | | | × | × |
| 31 | LAN cable | CBL1 | 1 | O | | | × | × |
| 32 | NIC132 | NICSV | 1 | O | 192.168.2.4/24 | | O | × |
| 33 | WWW server | SVR2 | 1 | × | | WWW2 | O | Host name |
| 34 | NIC134 | NICSV | 1 | O | 192.168.1.4/24 | | O | × |
| 35 | LAN cable | CBL1 | 1 | O | | | × | × |
| 36 | Application | apl1 | 1 | × | | | O | × |
| 37 | Application | apl2 | 2 | × | | | O | × |
| 38 | DB soft | db-soft | 1 | × | | 123456 | O | License No. |
| 39 | Self monitoring | apl4 | 1 | × | | | O | × |

Fig.9

RELATIONSHIP LIST TABLE ~24

| No. | PARENT ID | CHILD ID | RELATIONSHIP |
|---|---|---|---|
| 1 | 3 | 1 | CONNECTION |
| 2 | 3 | 2 | CONNECTION |
| 3 | 3 | 4 | CONTAINMENT |
| 4 | 5 | 4 | CONTAINMENT |
| 5 | 5 | 6 | CONTAINMENT |
| 6 | 6 | 7 | CONNECTION |
| 7 | 8 | 7 | CONNECTION |
| 8 | 9 | 8 | CONTAINMENT |
| 9 | 9 | 10 | CONTAINMENT |
| 10 | 9 | 11 | CONTAINMENT |
| 11 | 9 | 12 | CONTAINMENT |
| 12 | 12 | 13 | CONNECTION |
| 13 | 14 | 13 | CONNECTION |
| 14 | 15 | 14 | CONTAINMENT |
| 15 | 15 | 16 | CONTAINMENT |
|  |  |  |  |
|  |  |  |  |
|  |  |  |  |
|  |  |  |  |
|  |  |  |  |
| 16 | 25 | 38 | INSTALLATION |
| 17 | 28 | 36 | INSTALLATION |
| 18 | 33 | 37 | INSTALLATION |
| 19 | 15 | 39 | INSTALLATION |

Fig.10

SESSION TABLE 23

| ID | TYPE | PROTOCOL | ORIGIN ID | DESTINATION ID | OTHER INFORMATION (Port Number etc.) |
|---|---|---|---|---|---|
| 40 | SERVICE | http | 1 | 27 | *→apl1 |
| 41 | SERVICE | http | 1 | 32 | *→apl2 |
| 42 | SERVICE | http | 27 | 2 | apl1→svc1 |
| 43 | SERVICE | sql | 29 | 24 | apl1→db-soft |
| 44 | SERVICE | sql | 34 | 24 | apl2→db-soft |
| 45 | MAINTENANCE | ping | 14 | 6 | NIC114→NIC106 |
| 46 | MAINTENANCE | ping | 14 | 27 | NIC114→NIC127 |
| 47 | MAINTENANCE | ping | 14 | 32 | NIC114→NIC132 |
| 48 | MAINTENANCE | ping | 14 | 9 | NIC114→HUB109 |
| 49 | MAINTENANCE | ping | 16 | 29 | NIC116→NIC129 |
| 50 | MAINTENANCE | ping | 16 | 34 | NIC116→NIC134 |
| 51 | MAINTENANCE | ping | 16 | 24 | NIC116→NIC124 |
| 52 | MAINTENANCE | ping | 16 | 19 | NIC116→HUB119 |

Fig.11

BUSINESS SERVER MATRIX 25

|  | MONITORING BUSINESS | BUSINESS A | BUSINESS B |
|---|---|---|---|
| IMPORTANCE | LOW | HIGH | LOW |
| ADMIN Server | O |  |  |
| WWW1 Server |  | O |  |
| WWW2 Server |  |  | O |
| DB Server |  | O | O |
| External Service |  | O |  |

O : AFFECTED

Fig.12

BUSINESS SOFTWARE MATRIX 26

|  | MONITORING BUSINESS | BUSINESS A | BUSINESS B |
|---|---|---|---|
| apl1 |  | O |  |
| apl2 |  |  | O |
| apl4 | O |  |  |
| db-soft |  | O | O |

Fig.13

FAILURE IMPORTANCE MATRIX 27

| PROBLEM / TASK | HIGH | LOW |
|---|---|---|
| HIGH | URGENT | NORMAL |
| LOW | NORMAL | RESPOND DURING MAINTENANCE |

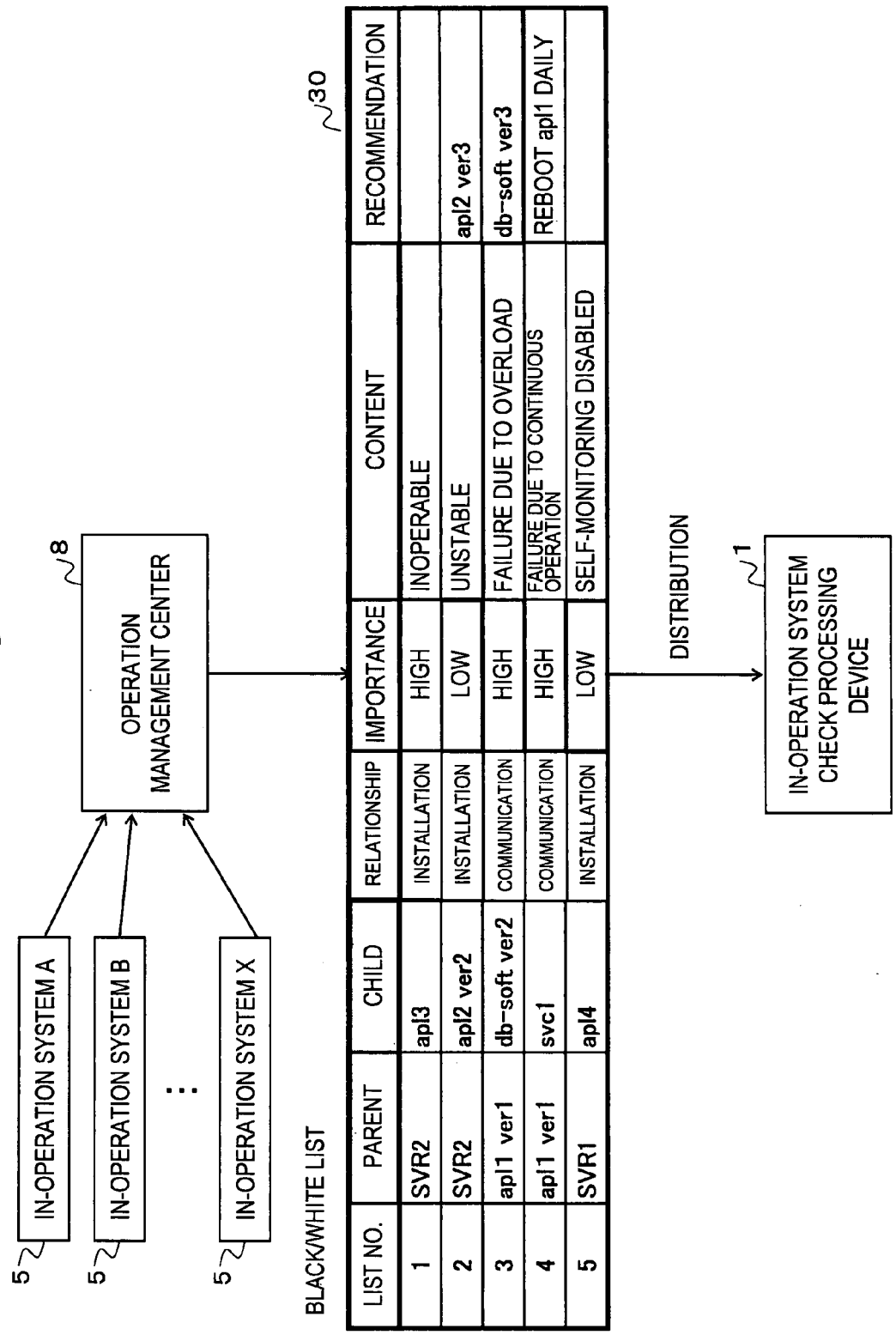

Fig.18

RELATIONSHIP LIST

| No | PARENT | CHILD | RELATIONSHIP |
|----|--------|-------|--------------|
| 4  | 5      | 4     | CONTAINMENT  |
| 5  | 5      | 6     | CONTAINMENT  |
| 6  | 6      | 8     | CONNECTION   |
| 8  | 9      | 8     | CONTAINMENT  |
| 9  | 9      | 10    | CONTAINMENT  |
| 10 | 9      | 11    | CONTAINMENT  |
| 11 | 9      | 12    | CONTAINMENT  |
| 12 | 12     | 14    | CONNECTION   |
| 14 | 15     | 14    | CONTAINMENT  |
| 15 | 15     | 16    | CONTAINMENT  |
|    |        |       |              |
| 16 | 25     | 38    | INSTALLATION |
| 17 | 28     | 36    | INSTALLATION |
| 18 | 33     | 37    | INSTALLATION |
| 19 |        |       |              |

⇕

EXPLORATION METHOD

| PING | Server View | sh interface | sh mac-address-table |
|------|-------------|--------------|----------------------|
|      |             | O            |                      |
|      |             | O            |                      |
|      |             |              | O                    |
|      | O           |              |                      |
|      | O           |              |                      |
|      | O           |              |                      |
|      |             |              |                      |
|      | O           |              | O                    |
|      | O           |              |                      |
|      |             |              |                      |
|      |             |              |                      |
|      | O           |              |                      |
|      | O           |              |                      |
|      | O           |              |                      |
|      |             |              |                      |

Fig.19

DEVICE EXPLORATION RESULT TABLE  ~28

| No. | MATERIAL MODEL | VERSION | IP ADDRESS | MATERIAL MODEL |
|---|---|---|---|---|
| 4 | NICFW | 1 | 10.1.0.1/24 | |
| 5 | FW1 | 1 | | FireWall |
| 6 | NICFW | 1 | 192.168.2.1/24 | |
| 8 | PT1 | 1 | | |
| 9 | HUB123 | 1 | 192.168.2.5/24 | |
| 10 | PT1 | 1 | | |
| 11 | PT1 | 1 | | |
| 12 | PT1 | 1 | | |
| 14 | NICSV | 1 | 192.168.2.2/24 | |
| 15 | SVR1 | 1 | | ADMIN |
| 16 | NICSV | 1 | 192.168.1.2/24 | |
| 18 | PT1 | 1 | | |
| 19 | HUB123 | 1 | | |
| 20 | PT1 | 1 | | |
| 21 | PT1 | 1 | | |
| 22 | PT1 | 1 | | |
| 24 | NICSV | 1 | 192.168.1.6/24 | |
| 25 | SVR3 | 1 | | DB |
| 27 | NICSV | 1 | 192.168.2.3/24 | |
| 28 | SVR2 | 1 | | WWW1 |
| 29 | NICSV | 1 | 192.168.1.3/24 | |
| 32 | NICSV | 1 | 192.168.2.4/24 | |
| 33 | SVR2 | 1 | | WWW2 |
| 34 | NICSV | 1 | 192.168.1.4/24 | |
| 36 | apl1 | 1 | | |
| 37 | apl2 | 2 | | |
| 38 | db-soft | 2 | | 123456 |
| 39 | | | | |

Fig.20

RELATIONSHIP EXPLORATION RESULT TABLE /29

| No. | PARENT | CHILD | RELATIONSHIP |
|-----|--------|-------|--------------|
| 4   | 5      | 4     | CONTAINMENT  |
| 5   | 5      | 6     | CONTAINMENT  |
| 6   | 6      | 8     | CONNECTION   |
| 8   | 9      | 8     | CONTAINMENT  |
| 9   | 9      | 10    | CONTAINMENT  |
| 10  | 9      | 11    | CONTAINMENT  |
| 11  | 9      | 12    | CONTAINMENT  |
| 12  | 12     | 14    | CONNECTION   |
| 14  | 15     | 14    | CONTAINMENT  |
| 15  | 15     | 16    | CONTAINMENT  |
|     |        |       |              |
|     |        |       |              |
| 16  | 25     | 38    | INSTALLATION |
| 17  | 28     | 36    | INSTALLATION |
| 18  | 33     | 37    | INSTALLATION |
| 19  |        |       | INSTALLATION |

Fig.21A (A)

| No. | PARENT | | | CHILD | | |
|---|---|---|---|---|---|---|
| | HOST NAME | MODEL | VERSION | MODEL | VERSION | LICENSE NUMBER |
| 16 | DB | SVR3 | 1 | db-soft | 1 | 123456 |
| 17 | WWW1 | SVR2 | 1 | apl1 | 1 | |
| 18 | WWW2 | SVR2 | 1 | apl2 | 2 | |
| 19 | ADMIN | SVR1 | 1 | apl4 | 1 | |

Fig.21B (B)

| No. | PARENT | | | CHILD | | |
|---|---|---|---|---|---|---|
| | HOST NAME | MODEL | VERSION | MODEL | VERSION | LICENSE NUMBER |
| 16 | DB | SVR3 | 1 | db-soft | 2 | 123456 |
| 17 | WWW1 | SVR2 | 1 | apl1 | 1 | |
| 18 | WWW2 | SVR2 | 1 | apl2 | 2 | |
| | | | | | | |

Fig.22

| No. | ORIGIN ||||| DESTINATION ||||| ASSOCIATED BUSINESS | BUSINESS IMPORTANCE |
|---|---|---|---|---|---|---|---|---|---|---|---|
| | HOST NAME | HARDWARE MODEL | HARDWARE VERSION | APPLICATION MODEL | APPLICATION VERSION | HOST NAME | HARDWARE MODEL | HARDWARE VERSION | APPLICATION MODEL | APPLICATION VERSION | | |
| 1 | | term1 | 1 | | | WWW1 | SVR2 | 1 | apl1 | 1 | BUSINESS A | HIGH |
| 2 | | term1 | 1 | | | WWW2 | SVR2 | 1 | apl2 | 2 | BUSINESS B | LOW |
| 3 | WWW1 | SVR2 | 1 | apl1 | 1 | | | | svc1 | | BUSINESS A | HIGH |
| 4 | WWW1 | SVR2 | 1 | apl1 | 1 | DB | SVR3 | 1 | db-soft | 1 | BUSINESS A | HIGH |
| 5 | WWW2 | SVR2 | 1 | apl2 | 2 | DB | SVR3 | 1 | db-soft | 1 | BUSINESS B | LOW |

Fig.23

| No. | ORIGIN | | | | DESTINATION | | | | | ASSOCIATED BUSINESS | BUSINESS IMPORTANCE |
|---|---|---|---|---|---|---|---|---|---|---|---|
| | HOST NAME | HARDWARE MODEL | HARDWARE VERSION | APPLICATION MODEL | APPLICATION VERSION | HOST NAME | HARDWARE MODEL | HARDWARE VERSION | APPLICATION MODEL | APPLICATION VERSION | | |
| 1 | | | | | | WWW1 | SVR2 | 1 | apl1 | 1 | BUSINESS A | HIGH |
| 2 | | | | | | WWW2 | SVR2 | 1 | apl2 | 2 | BUSINESS B | LOW |
| 3 | WWW1 | SVR2 | 1 | apl1 | 1 | | | | svc1 | | BUSINESS A | HIGH |
| 4 | WWW1 | SVR2 | 1 | apl1 | 1 | DB | SVR3 | 1 | db-soft | 2 | BUSINESS A | HIGH |
| 5 | WWW2 | SVR2 | 1 | apl2 | 2 | DB | SVR3 | 1 | db-soft | 2 | BUSINESS B | LOW |

Fig.24

| No. | ORIGIN ||||| DESTINATION ||||||| ASSOCIATED BUSINESS | BUSINESS IMPORTANCE |
|---|---|---|---|---|---|---|---|---|---|---|---|---|---|
| | HOST NAME | HARDWARE MODEL | HARDWARE VERSION | APPLICATION MODEL | APPLICATION VERSION | HOST NAME | HARDWARE MODEL | HARDWARE VERSION | APPLICATION MODEL | APPLICATION VERSION | | |
| 1 | | term1 | 1 | | | WWW1 | SVR2 | 1 | apl1 | 1 | BUSINESS A | HIGH |
| 2 | | term1 | 1 | | | WWW2 | SVR2 | 1 | apl2 | 2 | BUSINESS B | LOW |
| 3 | WWW1 | SVR2 | 1 | apl1 | 1 | | | | svc1 | 2 | BUSINESS A | HIGH |
| 4 | WWW1 | SVR2 | 1 | apl1 | 1 | DB | SVR3 | 1 | db-soft | 2 | BUSINESS A | HIGH |
| 5 | WWW2 | SVR2 | 1 | apl2 | 2 | DB | SVR3 | 1 | db-soft | 2 | BUSINESS B | LOW |

IN-OPERATION SYSTEM CHECK PROCESSING DEVICE, METHOD, AND PROGRAM THEREOF

CROSS-REFERENCE TO RELATED APPLICATIONS

This application claims priority from PCT International Application PCT/JP2005/007772 filed on Apr. 25, 2005, the contents of which are incorporated by reference herein.

BACKGROUND OF THE INVENTION

1. Field of the Invention

The present invention is related to an in-operation system check processing device that checks a configuration of a computer system in operation in order to achieve stabilization of an operation of the computer system.

2. Description of the Related Art

Conventionally, comparison checks between design information of a computer system and a substantiation thereof are performed manually during testing after construction of the computer system or the like. Comparison checks between design information of the computer system and the substantiation thereof are hardly ever performed after commencement of actual operation and provision of services.

On the other hand, there are techniques for checking design information with respect to restrictions as design support for a system or a network. An example of such a technique is an information network design support device described in Patent Document 1.

For the purpose of automatically checking for potential errors in a design result to arrive at an error-free design result in a prompt manner, with respect to the design of an information network that is realized by a combination of multi-vendor commercial devices and commercial software, the information network design support device according to Patent Document 1 is provided with functions for: conducting design work, for each network component, based on a network configuration table that is a list for inputting a specification or an attribute of the network component or a network configuration diagram that is a graphical form of the network configuration table; automatically performing, upon conclusion of such work, all required checks with respect to the completed network configuration table; and displaying check results in a list format in order to prompt a designer to perform design changes.

(Patent Document 1: Japanese Patent Laid-Open H07-319930)

In order to maintain the operation quality of a computer system constituted by a plurality of devices, it is necessary to accumulate caution information such as information related to malfunctions due to erroneous configuration or information related to hardware and software constituting the system on a daily basis through the operation of the computer system, and to check the configuration of the computer system in operation using the accumulated caution information.

However, due to the extremely large number of parts including software and hardware which constitute a computer system, manually conducting all these checks is extremely difficult.

The information network design support device according to Patent Document 1 is arranged to check for errors in design information and is not equipped with functions to check whether the configuration of a present system actually in operation is correct and to check for discrepancies with the design information. In addition, the device is not provided with a function for maintaining and, further, improving the operation quality of a network system by, for instance, performing a check on correspondence with caution items discovered afterwards and which were not contemplated at the time of design.

SUMMARY OF THE INVENTION

The present invention aims to solve the above problems, and it is an object thereof to provide a technique for enabling stable operation of a networked computer system and improving the operation quality of the computer system.

In order to achieve the above object, an in-operation system check processing device according to the present invention comprises: a design data storage unit for storing design data related to devices constituting a network system to be checked and to relationships between the devices; a check list storage unit for storing, as a check list, check conditions related to various caution information of the network system discovered in operation; an automatic exploration unit for exploring presence/absence of devices included in the network system actually in operation and relationships between the devices by issuing an exploration command or the like; an automatic exploration result data storage unit for storing automatic exploration result data; a system check unit for detecting a problematic device or a problematic combination of devices, or a potentially problematic device or a combination of potentially problematic devices in the network system actually in operation from automatic exploration result data and check conditions stored in the check list storage unit; and a caution information output unit for outputting caution information related to the detected device or combination of devices. Consequently, laborsaving on manually performed checks may be achieved and the operation quality of the network system may be improved.

In addition, according to the above-described invention, the system check unit further detects a problematic event using design data stored in the design data storage unit by collating a merge result of automatic exploration result data stored in the automatic exploration result data storage unit and the design data with check conditions stored in the check list storage unit. Consequently, network configuration information unobtainable even through automatic exploration may be supplemented by design data to achieve checks having a higher degree of perfection.

Furthermore, according to the above-described invention, further provided are: a exploration result check unit for detecting devices existing in design data but not in automatic exploration result data and devices existing in automatic exploration result data but not in design data by collating design data stored in the design data storage unit with automatic exploration result data stored in the automatic exploration result data storage unit; and a check result output unit for outputting information on check results of the exploration result check unit. Consequently, erroneous configuration, change statuses of the system and the like may be detected by checking differences between the configurations of the network system at the time of design and the network system in operation.

Moreover, according to the above-described invention, information on software programs installed on computers included in the network system as well as information on communication performed between the software programs are provided as design data stored in the design data storage unit and automatic exploration result data stored in the automatic exploration result data storage unit. Additionally, information on problems in communication performed between the software programs are provided as check conditions stored in the check list storage unit. Consequently, problems such as system instability caused by communication for business services may be prevented.

Furthermore, according to the above-described invention, information on importance of the impact of an occurrence of a problem on services is provided as check conditions stored in the check list storage unit. Consequently, an operation manager of the system may be notified of information for determining whether urgency is required upon output of caution information in correspondence with the check list.

According to the present invention, since a current in-operation system is checked for correspondence with caution items discovered afterwards and which were not contemplated at the time of system design, and caution information thereof is outputted if applicable, factors that may cause instability of the operation of the system may be removed in accordance with outputted caution information prior to the actual occurrence of failures and the like. In addition, checks may be performed on the presence/absence of discrepancies between the configuration of the current system actually in operation and the design information of the system. Therefore, the operation quality of a network system may be maintained and may further be improved.

BRIEF DESCRIPTION OF THE DRAWINGS

FIG. 8 is a diagram showing an example of a device table;

FIG. 9 is a diagram showing an example of a relationship list table;

FIG. 10 is a diagram showing an example of a session table;

FIG. 11 is a diagram showing an example of a business server matrix;

FIG. 12 is a diagram showing an example of a business software matrix;

FIG. 13 is a diagram showing an example of a failure importance matrix;

FIG. 14 is a diagram showing an example of a black/white list;

FIG. 18 is a diagram explaining information on relationships between devices obtained through automatic exploration;

FIG. 19 is a diagram showing an example of a device exploration result table obtained through automatic exploration;

FIG. 20 is a diagram showing an example of a relationship exploration result table obtained through automatic exploration;

FIGS. 21A and B are diagrams explaining comparison checks between design data in a network management DB and automatic exploration results of an in-operation system;

FIG. 22 is a diagram showing an example of design data;

FIG. 23 is a diagram showing an example of an automatic exploration result;

FIG. 24 is a diagram showing an example of data obtained by merging design data and an automatic exploration result.

DETAILED DESCRIPTION OF THE PREFERRED EMBODIMENTS

An embodiment of the present invention will now be described with reference to the drawings.

Figure 1:
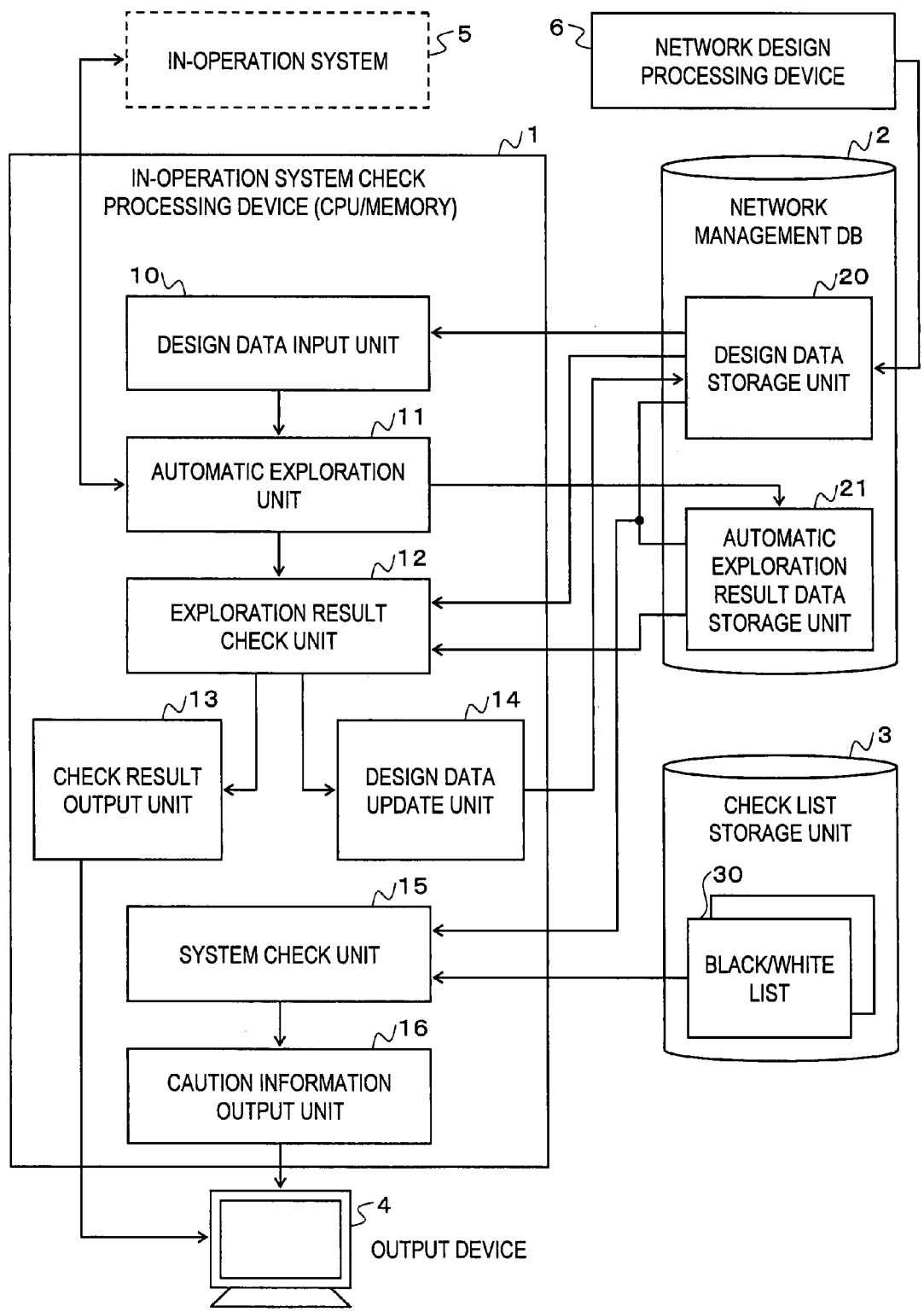
FIG. 1 is a diagram showing a configuration example of an in-operation system check processing device according to an embodiment of the present invention.

FIG. 1 is a diagram showing a configuration example of an in-operation system check processing device according to an embodiment of the present invention. An in-operation system check processing device 1 comprises a design data input unit 10, an automatic exploration unit 11, an exploration result check unit 12, a check result output unit 13, a design data update unit 14, a system check unit 15, and a caution information output unit 16. The respective units are realized by a computer constituted by hardware such as a CPU and a memory as well as software programs. A network management DB 2, a check list storage unit 3 and an output device 4 are connected to the in-operation system check processing device 1. An in-operation system 5 connected thereto is a check object.

The network management DB 2 comprises a design data storage unit 20 and an automatic exploration result data storage unit 21. The check list storage unit 3 stores a black/white list 30. A network design processing device 6 is a computer that designs a network system using a CAD or the like and stores the design data in the design data storage unit 20.

The design data input unit 10 inputs design data from the design data storage unit 20 of the network management DB 2.

Based on the inputted design data, the automatic exploration unit 11 automatically explores the in-operation system 5 by, for instance, issuing a command for confirming connection of network devices. An obtained automatic exploration result is stored in the automatic exploration result data storage unit 21 of the network management DB 2.

The exploration result check unit 12 performs a comparison check between topological data of design data and topological data of an automatic exploration result in order to verify whether both topological data match each other. The check result output unit 13 outputs the result of the comparison check between topological data of design data and topological data of an automatic exploration result to the output device 4.

The design data update unit 14 updates design data in the network management DB 2 according to the check result of the exploration result check unit 12 in the event that updating is required. An event that requires updating of design data is an event where a discrepancy exists between the actual configuration of the in-operation system 5 obtained from the automatic exploration result and the design data and where it is desirable to adjust the design data to the actual configuration of the in-operation system 5. Updating of design data by the design data update unit 14 may be arranged to be either automatically performed based on preset information on availability of automatic update or performed under an instruction from an operation manager of the system.

The system check unit 15 merges topological data of design data and topological data of an automatic exploration result, and collates the merge result with the black/white list 30 of the check list storage unit 3.

As a result of the collation by the system check unit 15, when there are any caution items such as a warning regarding the current in-operation systems 5 or recommendations for improving stability, the caution information output unit 16 outputs information on the caution item to the output device 4 in order to notify the operation manager.

A more detailed description of the present embodiment will now be given with reference to FIGS. 2 to 25. First, creation of design data stored in the network management DB 2 will be described with reference to FIGS. 2 to 13.

Figure 2:
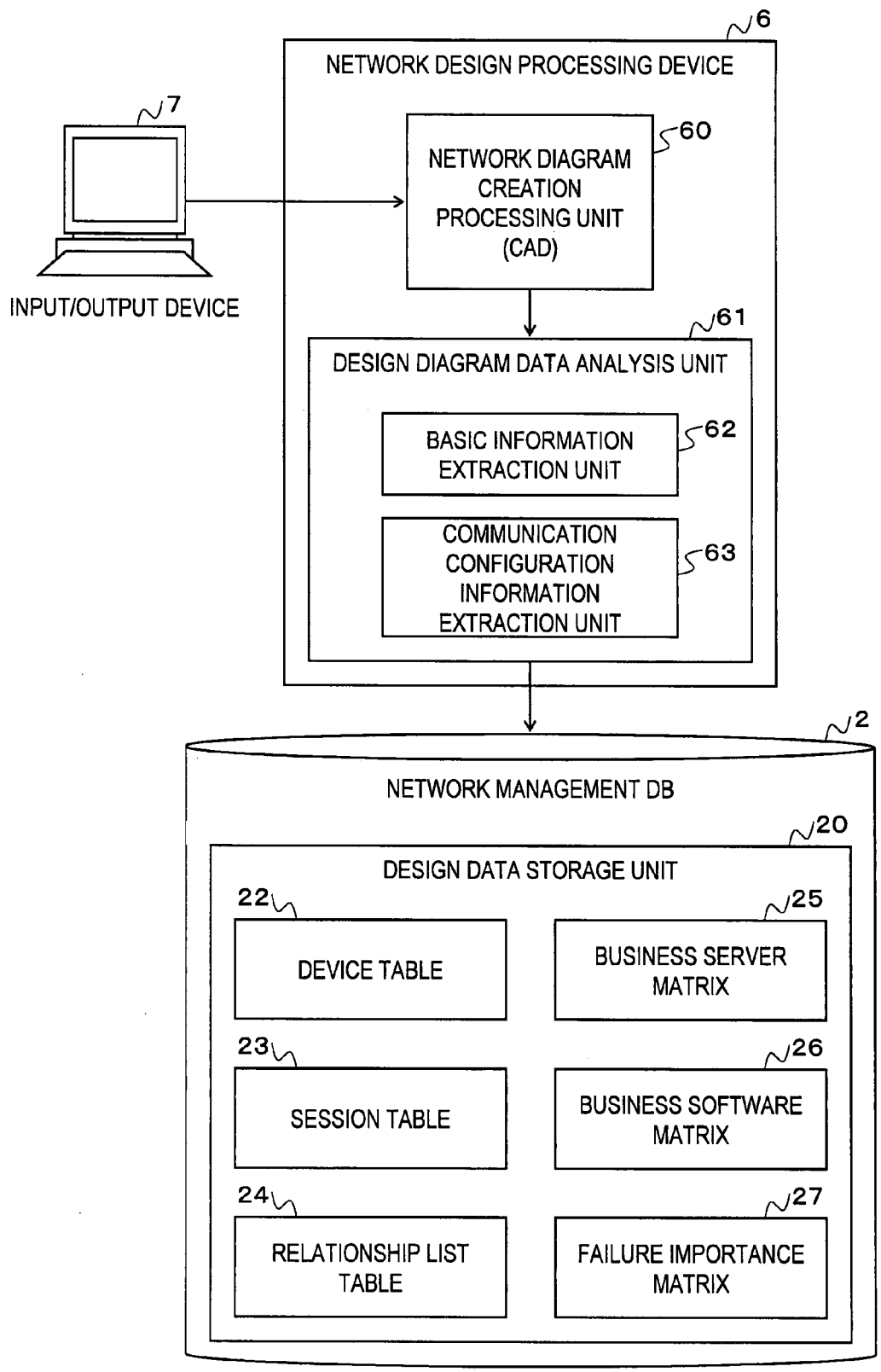
FIG. 2 is a diagram showing a configuration example of a network design processing device.

FIG. 2 is a diagram showing a configuration example of a network design processing device. Design data stored in the design data storage unit 20 shown in FIG. 1 is design information which is extracted from a network diagram created by the network design processing device 6.

The network design processing device 6 comprises a network diagram creation processing unit 60 and a design diagram data analysis unit 61. The design diagram data analysis unit 61 comprises a basic information extraction unit 62 and a communication configuration information extraction unit 63. An input/output device 7 is connected to the network design processing device 6.

The design data storage unit 20 of the network management DB 2 stores design data such as a device table 22, a session table 23, a relationship list table 24, a business server matrix 25, a business software matrix 26 and a failure importance matrix 27.

The network diagram creation processing unit 60 is equipped with, for instance, a function of graphics processing software such as a CAD. A designer of the network system creates a network diagram by operating the network diagram creation processing unit 60 using the input/output device 7.

The design diagram data analysis unit 61 analyzes a network diagram created by the network diagram creation processing unit 60 and extracts design data. As design data to be extracted from a network diagram, the basic information extraction unit 62 extracts basic information such as: information on each device described on the network diagram; when a device is a computer, information on software installed on the computer; and information on the physical connection relationship between the respective devices. As design data to be extracted from a network diagram, the communication configuration information extraction unit 63 extracts communication configuration information such as information on communication configured between the devices. The extracted design data is stored in the design data storage unit 20 of the network management DB 2.

Figure 3:
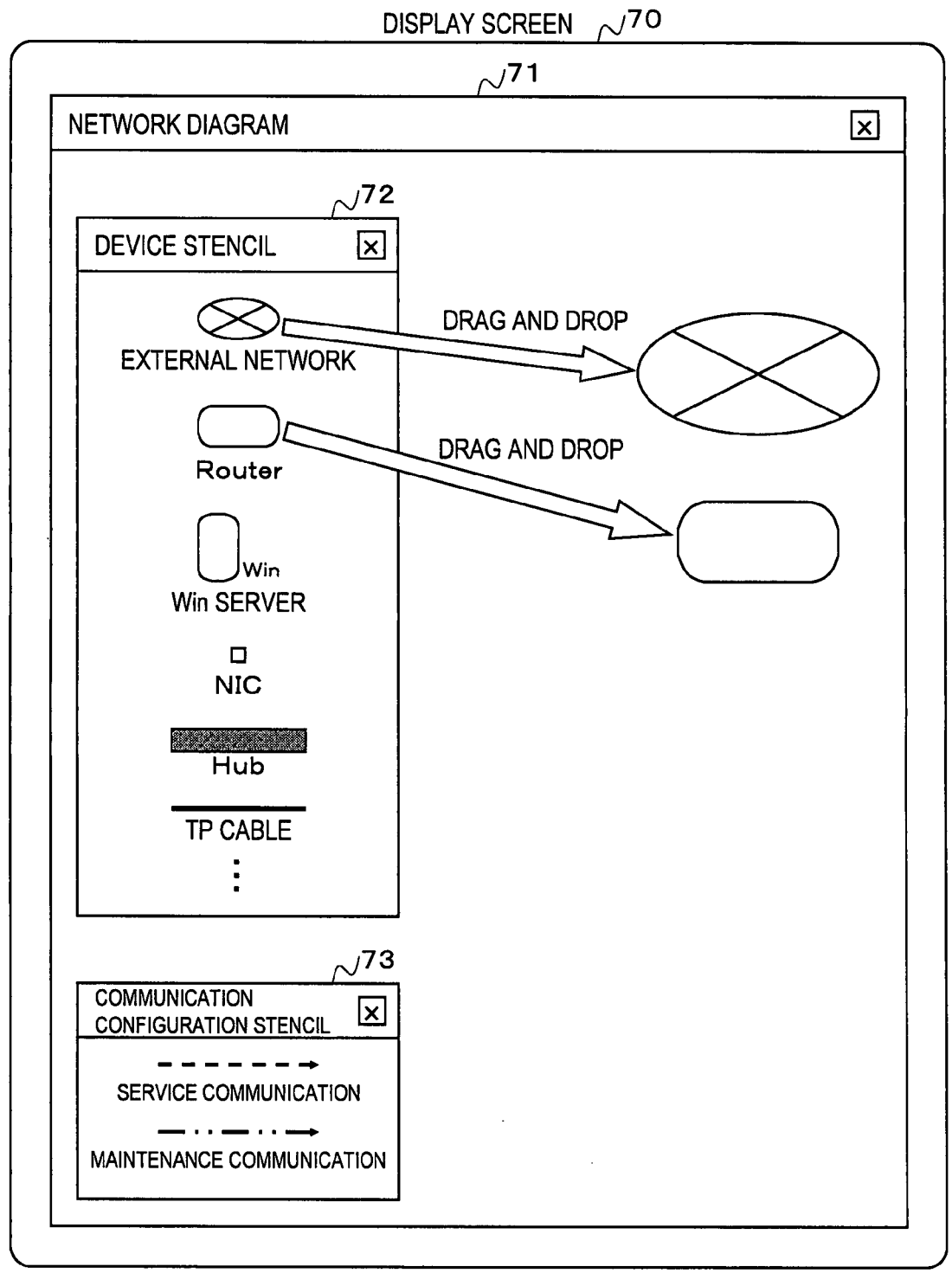
FIG. 3 is a diagram explaining the creation of a network diagram.

FIG. 3 is a diagram explaining the creation of a network diagram. In FIG. 3, a network diagram window 71 is opened on a display screen 70 of the input/output device 7. The designer creates a network diagram on the network diagram window 71 by operating the network diagram creation processing unit 60 using the input/output device 7. Hereafter, an example will be described in which a mouse having left and right buttons is used as a pointing device for creating the network diagram. Similar processing may be achieved using other pointing devices.

Parts of the respective devices used in the network are arranged in a device stencil window 72. Parts used to configure communication are arranged in a communication configuration stencil window 73. The designer selects a device part to be arranged in the network diagram from the device stencil window 72 by left-clicking the mouse, whereby the selected device part is arranged in the network diagram by a drag and drop. The above-described method for creating a network diagram through the application of a CAD is similar to conventionally-used methods.

Figure 4:
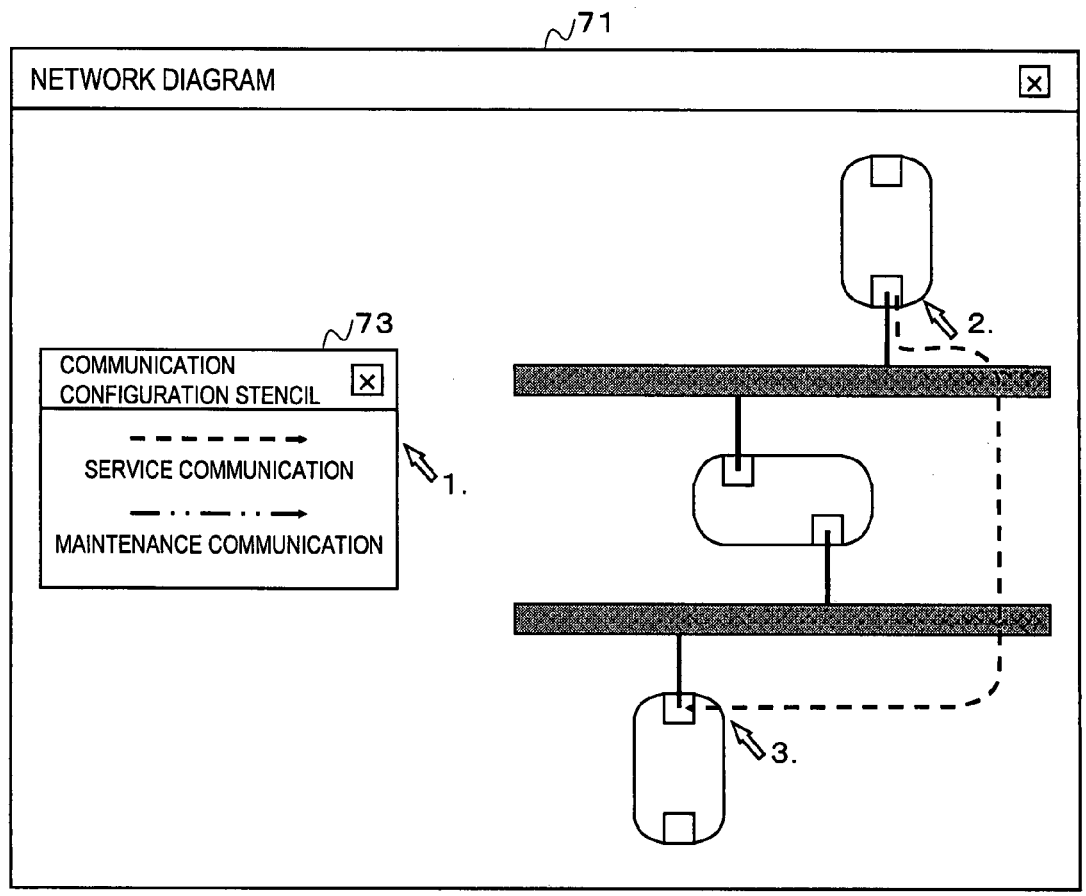
FIG. 4 is a diagram explaining operation procedures for communication configuration.

FIG. 4 is a diagram explaining operation procedures for communication configuration. First, the designer selects a communication part to be configured from the communication configuration stencil window 73 by clicking on the communication part with the mouse (operation procedure 1). Next, the designer clicks on a portion to become a communication origin with the mouse (operation procedure 2). Finally, the designer clicks on a portion to become a communication destination on the network diagram with the mouse (operation procedure 3). As a result, an arrow from the communication origin to the destination thereof is displayed on the network diagram, and the communication configuration information is stored in the memory as design data.

Figure 5:
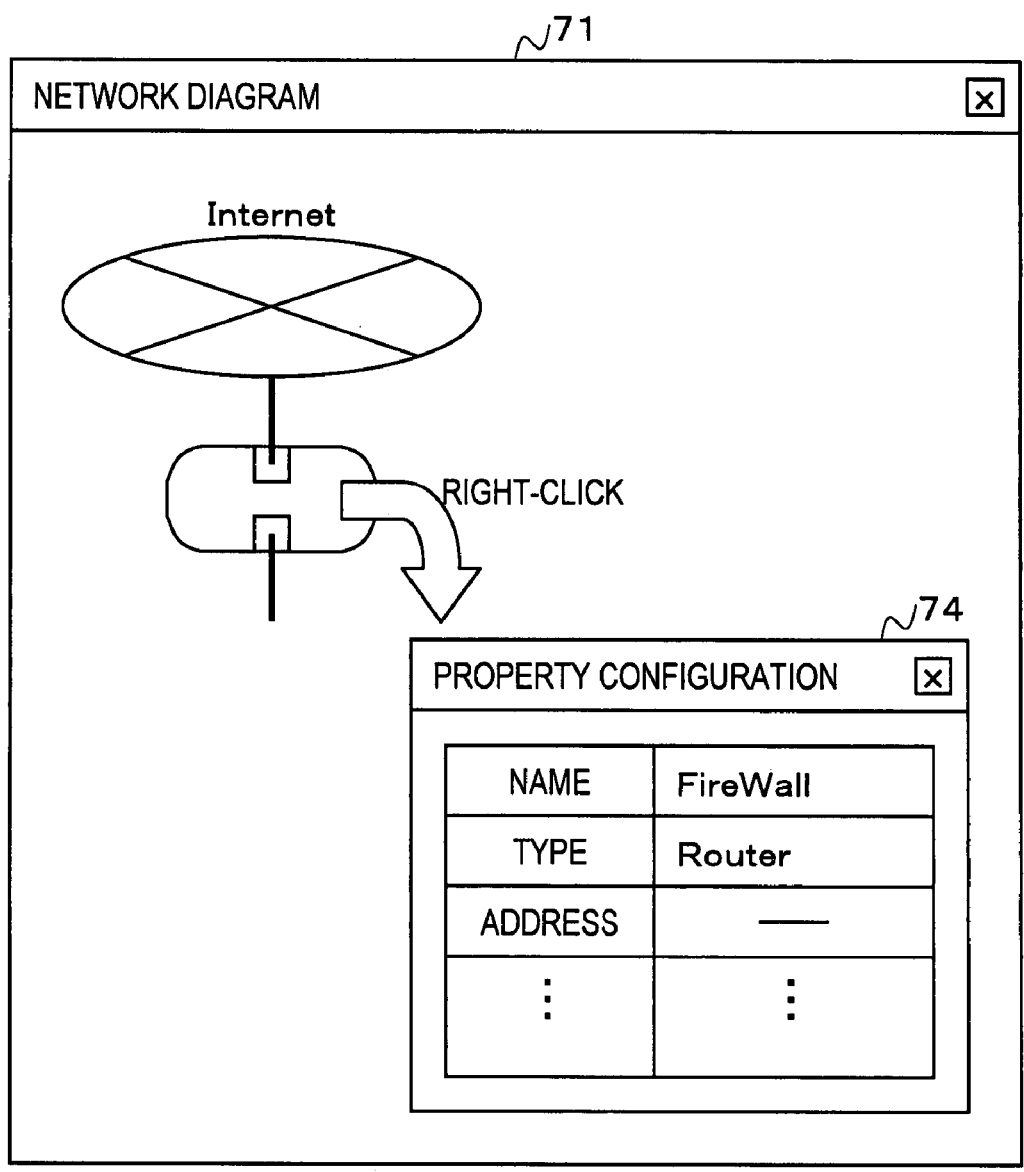
FIG. 5 is a diagram explaining property configuration.

FIG. 5 is a diagram explaining property configuration. The designer chooses a device or a communication arrow on the network diagram on which property configuration is to be performed by clicking the right button of the mouse (this is referred to as a right-click), and opens a property configuration window 74. The designer is now able to configure the respective attributes of the device on the property configuration window 74.

Attribute information on each device and communication may be defined in advance for each part of the device stencil and the communication stencil, and may be retained as part attribute information in an attribute file (not shown) managed by the network diagram creation processing unit 60. At the property configuration window 74, with respect to attribute items defined in advance in the attribute file, attribute information read out from the attribute file are embedded as default values. Therefore, the designer need only input attribute information unique to the respective devices or communication from the property configuration window 74. For instance, the designer need only input minimum necessary attribute information such as a host name or address information of a server.

Figure 6:
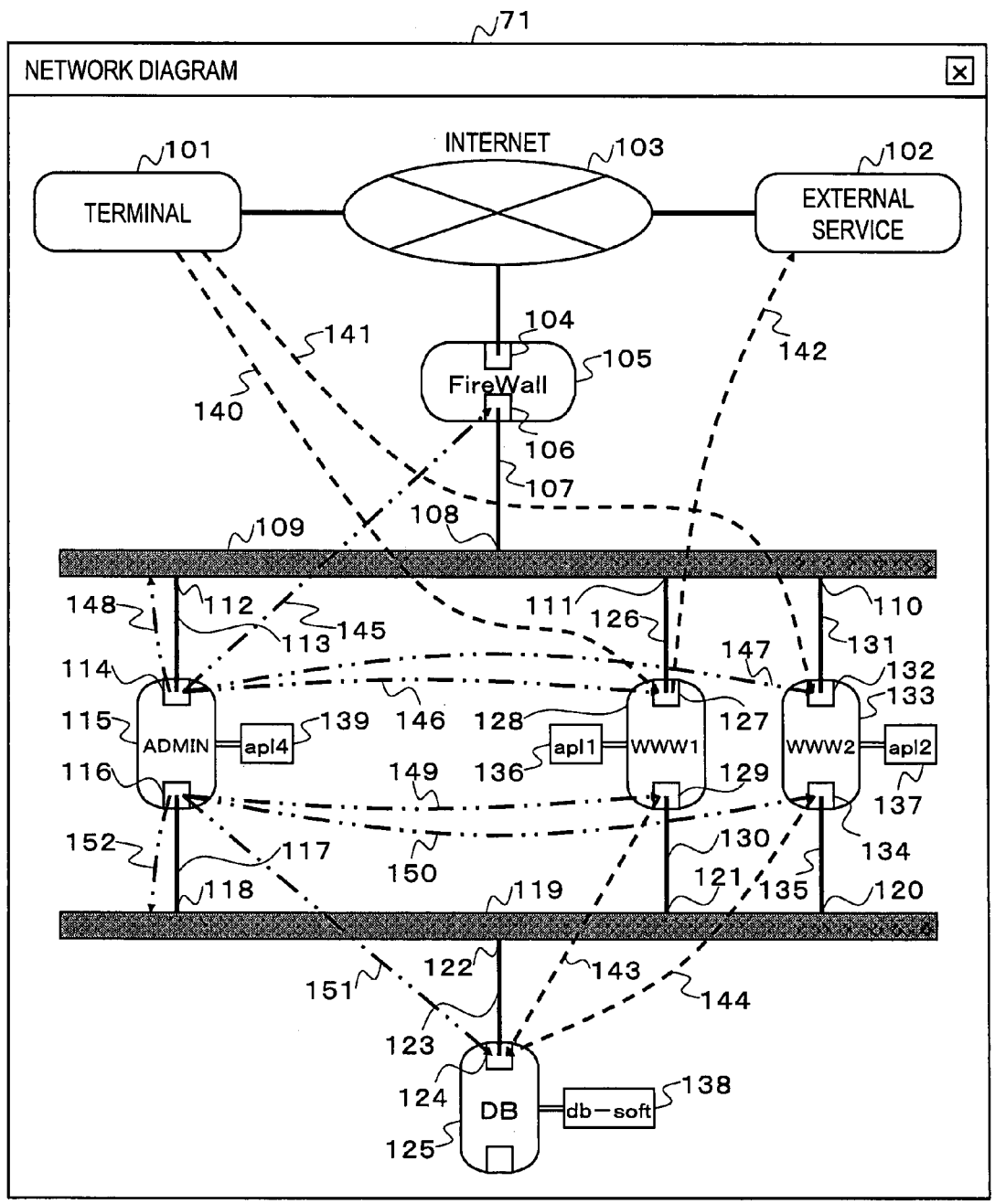
FIG. 6 is a diagram showing an example of a designed network diagram.

FIG. 6 is a diagram showing an example of a designed network diagram. In this case, the designer of the network system creates a network diagram such as that shown in FIG. 6 by operating the network diagram creation processing unit 60 using the input/output device 7. In the network diagram shown in FIG. 6, a designed computer system is connected via a FireWall 105 to the Internet 103 outside.

A DB server 125, a WWW1 server 128 and a WWW2 server 133 are service system servers for providing service to outside clients. A terminal 101 is capable of receiving service provided by the designed computer system by accessing the WWW1 server 128 and the WWW2 server 133 via the Internet 103. In addition, the WWW1 server 128 is capable of receiving service provided by an external service 102 by accessing the external service 102 via the Internet 103.

An ADMIN server 115 is a maintenance system server for performing maintenance and management such as status checks of each device constituting the computer system.

The FireWall 105, the ADMIN server 115, the DB server 125, the WWW1 server 128 and the WWW2 server 133 are mounted with network interface cards (104, 106, 114, 116, 124, 127, 129, 132, and 134). Hereinafter, a network interface card shall be referred to as an NIC.

The NIC 106, the NIC 114, the NIC 127 and the NIC 132 are respectively connected to a port 108, a port 112, a port 111 and a port 110 of a HUB 109 via a LAN cable 107, a LAN cable 113, a LAN cable 126 and a LAN cable 131. In addition, the NIC 116, the NIC 124, the NIC 129 and the NIC 134 are respectively connected to a port 118, a port 122, a port 121 and a port 120 of a HUB 119 via a LAN cable 117, a LAN cable 123, a LAN cable 130 and a LAN cable 135.

Furthermore, an application program (hereinafter simply referred to as an application) 136 is installed on the WWW1 server 128, an application 137 is installed on the WWW2 server 133, DB software 138 is installed on the DB server 125, and self-monitoring software 139 is installed on the ADMIN server 115.

Moreover, the designer describes communication configuration necessary for operating the network system by operating the network diagram creation processing unit 60 using the input/output device 7. Two types of communication configurations namely, for service and for maintenance, are described in the network diagram shown in FIG. 6. In the diagram, the dashed-line arrows represent communication configurations for service process while the dashed-two dotted lines represent communication configurations for maintenance. By separately describing communication configurations for servicing and communication configurations for maintenance on a network diagram in this manner, it is now possible to perform various processing including checking, to be described later, in a simple manner.

Communication configurations for servicing described on the network diagram in FIG. 6 are: a communication configuration 140 from the terminal 101 to the NIC 127 of the WWW1 server 128; a communication configuration 141 from the terminal 101 to the NIC 132 of the WWW2 server 133; a communication configuration 142 from the NIC 127 of the WWW1 server 128 to the external service 102; a communication configuration 143 from the NIC 129 of the WWW1 server 128 to the NIC 124 of the DB server 125; and a communication configuration 144 from the NIC 134 of the WWW2 server 133 to the NIC 124 of the DB server 125.

In addition, on the network diagram in FIG. 6, a communication configuration 145, a communication configuration 146, a communication configuration 147 and a communication configuration 148 are respectively described as communication configurations for maintenance from the NIC 114 of the ADMIN server 115 to the NIC 106 of the FireWall 105, to the NIC 127 of the WWW1 server 128, to the NIC 132 of the WWW2 server 133, and to the HUB 109, while a communication configuration 149, a communication configuration 150, a communication configuration 151 and a communication configuration 152 are respectively described as communication configurations for maintenance from the NIC 116 of the ADMIN server 115 to the NIC 129 of the WWW1 server 128, to the NIC 134 of the WWW2 server 133, to the NIC 124 of the DB server 125, and to the HUB 119.

Figure 7:
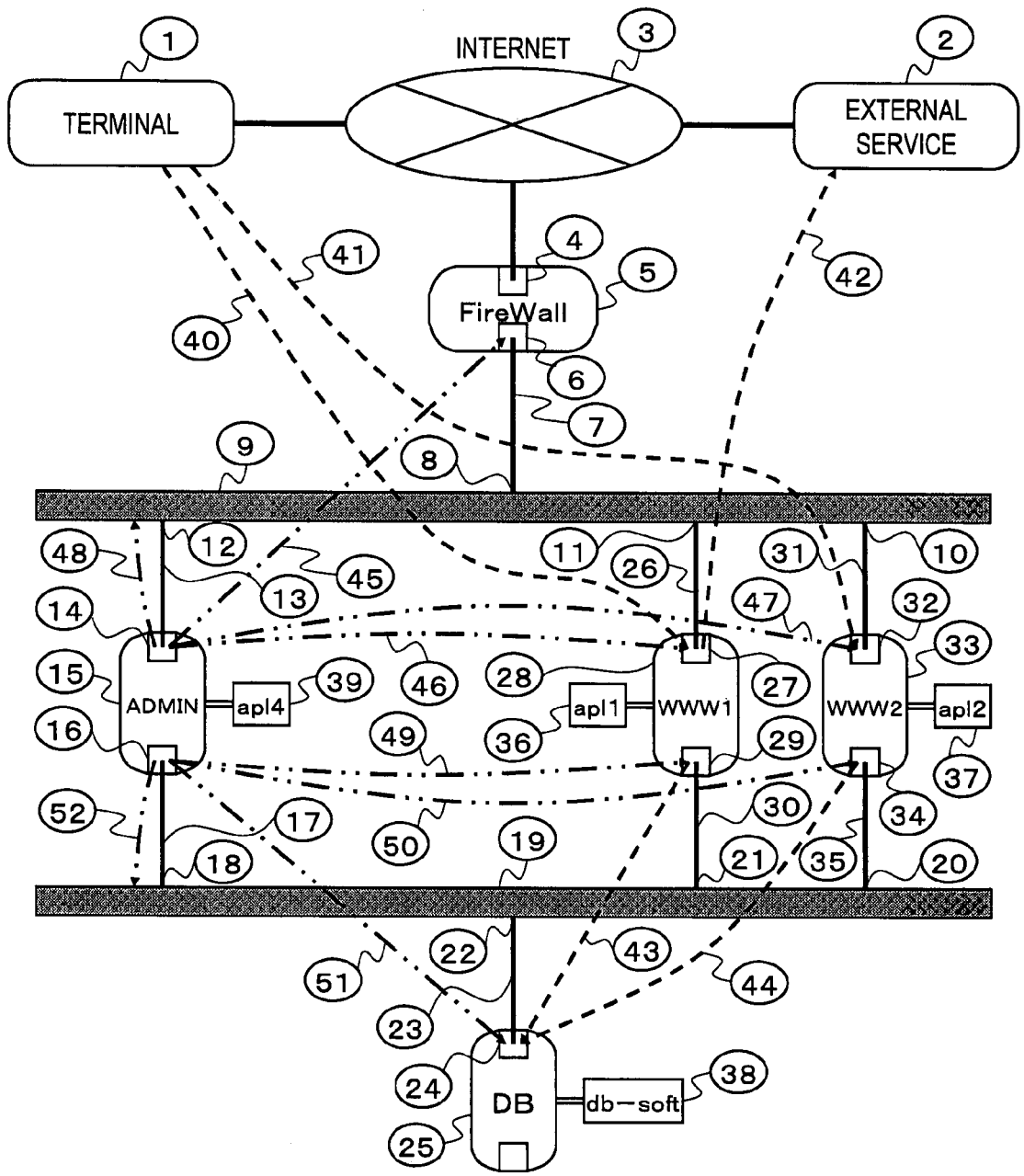
FIG. 7 is a diagram showing an example of management object IDs assigned to respective parts.

FIG. 7 is a diagram showing an example of management object IDs assigned to the respective parts. Each part constituting a network diagram is assigned a management object ID that allows the part to be uniquely identified. In FIG. 7, numerals in ovals are management object IDs assigned to the parts. These management object IDs are identifiers automatically attached by the network diagram creation processing unit 60 when pasting parts (objects) that are graphic elements from the device stencil or the communication configuration stencil such as those shown in FIG. 3 onto the network diagram.

FIG. 8 is a diagram showing an example of a device table. The device table 22 in the example shown in FIG. 8 is a table having network configuration information created by the design diagram data analysis unit 61 shown in FIG. 2 from the network diagram shown in FIG. 6, and is stored in the design data storage unit 20 in the network management DB 2. A record in the device table 22 consists of items such as an "management object ID" that uniquely identifies the device, a "name", a "model" and a "version" of the device, an "IP relay" that indicates whether the device relays IP packets, an "IP address" that is assigned to the device, a "host name etc." that indicates a host name, a license number or the like of the device, "automatic exploration" indicating whether the device is detectable through automatic exploration, and "individual identification" indicating what will be used for identification when identifying uniformity between a device in design data and a device explored through automatic exploration.

FIG. 9 is a diagram showing an example of a relationship list table. The relationship list table 24 in the example shown in FIG. 9 is a table, created based on the network diagram shown in FIG. 6, of information indicating the relationships between the devices, and is stored in the design data storage unit 20 in the network management DB 2. The relationship list table 24 consists of parent IDs indicating management object IDs of devices to become parents, child IDs indicating management object IDs of devices to become children, information on relationships between devices indicated by parent IDs and devices indicated by child IDs.

FIG. 10 is a diagram showing an example of a session table. The session table 23 in the example shown in FIG. 10 is a table indicating communication relationships created based on communication configuration information described in the network diagram shown in FIG. 6, and is stored in the design data storage unit 20 in the network management DB 2. The session table 23 consists of management object IDs that uniquely identify communication configurations, communication configuration types, protocols used in communication configurations, origin IDs indicating management object IDs of devices that become origins of communications, destination indicating management object IDs of devices that become destinations of communications, as well as other information.

FIG. 11 is a diagram showing an example of a business server matrix. The business server matrix 25 depicted in the example shown in FIG. 11 is information representing the relationships between respective business processing and the respective servers, and is stored in the design data storage unit 20 in the network management DB 2. In the business server matrix 25 shown in FIG. 11, a monitoring business is business processing of the maintenance system, while a business A and a business B are business processing of the service system. The business server matrix 25 is created based on server attribute information inputted upon creation of the network diagram.

An importance is set for each business processing. Business processing with a high importance is processing that requires prompt recovery in the event that a failure occurs or the like. In contrast, business processing with a low importance is processing that does not require urgent recovery in the event that a failure occurs or the like. In the example of the business server matrix 25 shown in FIG. 11, a high importance is set for the business A, while a low importance is set for the monitoring processing and the business processing B.

The business server matrix 25 shown in FIG. 11 suggests that the ADMIN server 115 is related to the monitoring business. The WWW1 server 128, the DB server 125 and the external service 102 are related to the business A. The WWW2 server 133 and the DB server 125 are related to the business processing B. Business processing is affected when a problem occurs at a server related thereto. For example, monitoring processing is affected when a problem occurs at the ADMIN server 115.

FIG. 12 is a diagram showing an example of a business software matrix. The business software matrix 26 depicted in the example shown in FIG. 12 is information representing the relationships between respective business processing and respective software, and is stored in the design data storage unit 20 in the network management DB 2. The business software matrix 26 is created based on software attribute information inputted upon creation of the network diagram.

Self-monitoring software 139 (apl4) is used for the monitoring processing. An application 136 (apl1) and DB software 138 (db-soft) are used for the business processing A. An application 137 (apl2) and the DB software 138 (db-soft) are used for the business processing B.

FIG. 13 is a diagram showing an example of a failure importance matrix. The failure importance matrix 27 depicted in the example shown in FIG. 13 is created based on the configuration information inputted together with the network diagram, and is stored in the design data storage unit 20 in the network management DB 2. The failure importance matrix 27 is information indicating the required level of response in accordance with a combination of each importance of business processing and a level of an occurring problem.

The failure importance matrix 27 shown in FIG. 13 indicates that, when a high-level problem occurs in business processing having a high importance, an urgent response is required. In contrast, the failure importance matrix 27 shows that urgency is low when a low-level problem occurs in business processing having a low importance and, for instance, a response during regular maintenance shall suffice. A normal-level response should be performed in a case where a low-level problem occurs in business processing having a high importance or in a case where a high-level problem occurs in business processing having a low importance.

Next, creation of the black/white list 30 stored in the check list storage unit 3 will be described with reference to FIG. 14.

FIG. 14 is a diagram showing an example of a black/white list. The black/white list 30 retains information indicating problematic devices (including software programs), potentially problematic devices or combinations thereof as check conditions, and contents of problems, importance, information recommending devices desirable with respect to functions and capabilities of the system and the like as caution information, in accordance with the in-operation system 5.

With the devices used in the in-operation system 5, there are cases where a problem not discovered prior to installation is discovered afterwards. In addition, combinations of devices include those that are compatible and those that are incompatible. For instance, there is a case where an application installed on a server of a certain model does not operate properly. Such compatibility between devices includes those that only become apparent after operation in addition to those that are known at the time of introduction.

An operation management center 8 that manages a plurality of in-operation systems collects information on the compatibility between devices from problems that have occurred in the plurality of in-operation systems 5 or from operational statuses thereof, and creates the black/white list 30. Records of the black/white list 30 may either be created based on information inputted by a manager or a maintenance person of each in-operation system 5 or created based on information inputted by an operator of the operation management center 8 according to a notification from the in-operation systems 5. The created black/white list 30 is stored in the check list storage unit 3 and is updated whenever new information is obtained. The black/white list 30 is distributed to the in-operation system check processing device 1 to be used for system checks of the in-operation system 5.

A record of the black/white list 30 shown in FIG. 14 consists of items such as a model of a parent device, a model of a child device, a relationship between the parent and the child, an importance of a problem that occurs due to the parent-and-child combination, contents of the occurring problem, and information on a recommended response.

For example, referring now to a list No. 2 of the black/white list 30 shown in FIG. 14, it is recorded in the list No. 2 that a low-importance problem of an unstable system occurs when an application (child) whose model is "apl2" and version is "ver. 2" is installed on a server (parent) whose model is "SVR2". In addition, it is recorded that a recommended response is to upgrade the version of the "apl2" to "ver. 3".

Performing checks on an in-operation system using the black/white list 30 as described above enables more preferable reconfiguration and operation of a network system.

Next, check processing of an in-operation system according to the present embodiment will be described in specific terms with reference to FIGS. 15 to 25.

The in-operation system check processing device 1 performs a comparison check between design data in the network management DB 2 and an automatic exploration result of the in-operation system 5 to verify omissions or the absence/presence of changes in the configuration of in-operation system 5. A comparison check between design data and an automatic exploration result will now be described with reference to FIGS. 15 to 21.

Figure 15:
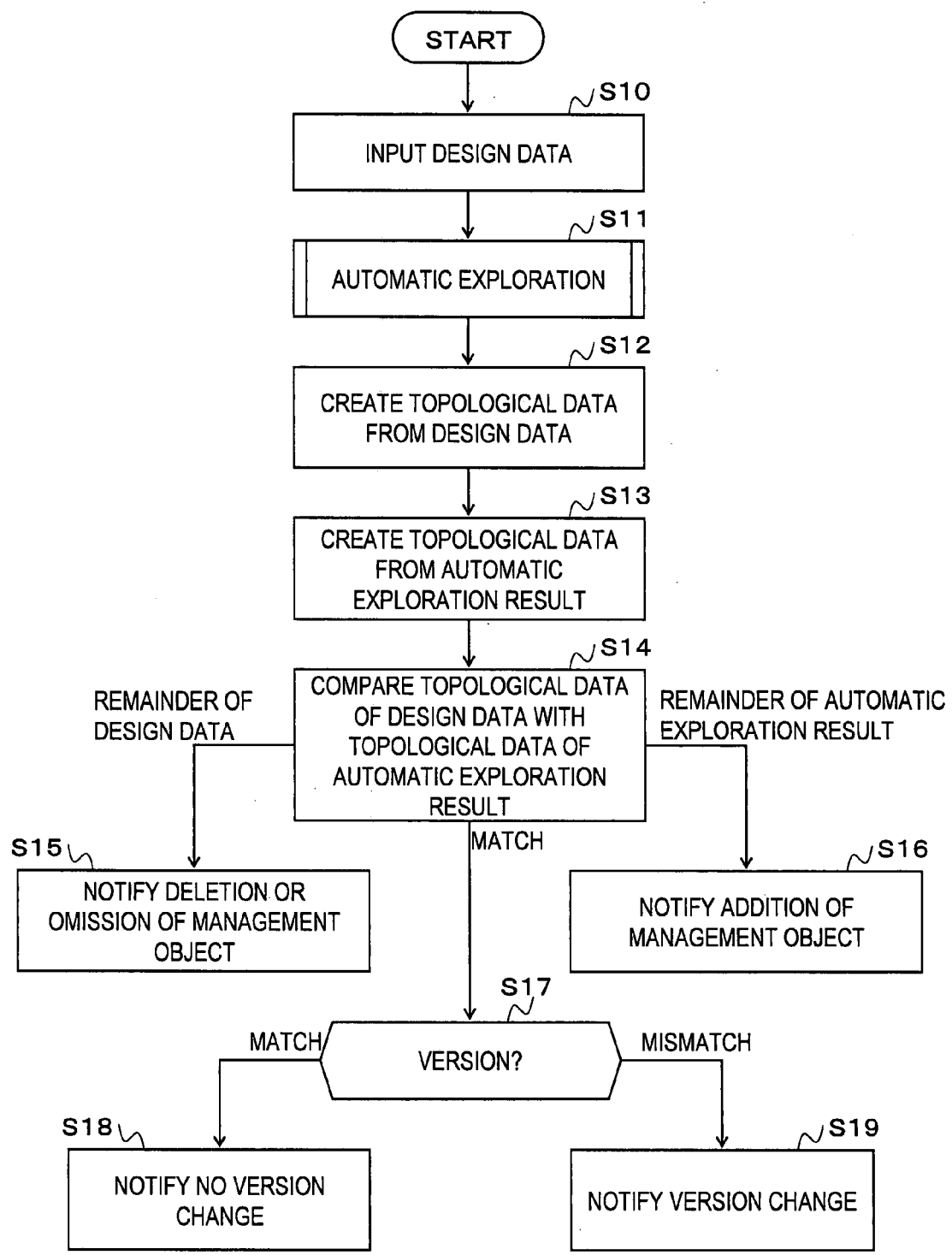
FIG. 15 is a processing flowchart of a comparison check between design data in a network management DB and an automatic exploration result of an in-operation system according to the present embodiment.

FIG. 15 is a processing flowchart of a comparison check between design data in the network management DB and an automatic exploration result of an in-operation system according to the present embodiment. The in-operation system check processing device 1 detects changes or errors in system configuration by performing a comparison check between topological information on the in-operation system 5 and design topological information of the system.

The design data input unit 10 inputs design data from the design data storage unit 20 of the network management DB 2 (step S10). Based on the inputted design data, the automatic exploration unit 11 determines an address range to be automatically explored or a device that is automatically explorable, and performs automatic exploration processing on the in-operation system 5 (step S11). An obtained automatic exploration result through the automatic exploration processing is stored in the automatic exploration result data storage unit 21 of the network management DB 2.

The exploration result check unit 12 creates topological data of design data inputted from the design data storage unit 20 (step S12), and concurrently creates topological data of the automatic exploration result inputted from the automatic exploration result data storage unit 21 (step S13). The exploration result check unit 12 compares the created topological data of design data with the created topological data of the automatic exploration result (step S14). In this case, topological data refers to data converted into the same data format in order to facilitate comparing and contrasting between design data and an automatic exploration result.

As a result of the comparison of step S14, when there remains a management object device on the design data-side, the check result output unit 13 notifies the operation manager that the management object device has been deleted from the in-operation system 5 or an omission of installation has occurred at the management object device (step S15). On the other hand, as a result of the comparison of step S14, when there remains a management object device on the automatic exploration result-side, the check result output unit 13 notifies the operation manager that the management object device has been added to the in-operation system 5 (step S16).

As a result of the comparison of step S14, when both topological data match each other, the exploration result check unit 12 checks the versions of both management object devices (step S17). When the versions of both management object devices match each other, the check result output unit 13 notifies the operation manager that versions have not been changed (step S18). When the versions of both management object devices do not match each other, the check result output unit 13 notifies the operation manager that versions have been changed (step S19).

Automatic exploration processing of the in-operation system 5 may be performed by having the in-operation system check processing device 1 directly issue an exploration command to the in-operation system 5 using any communication means or by requesting a specific server such as the ADMIN server 115 (FIG. 6) of the in-operation system 5 to perform an automatic exploration and then receive an automatic exploration result from the specific server. In addition, the ADMIN server 115 of the in-operation system 5 may be equipped with all of the functions of the in-operation system check processing device 1 so that the ADMIN server 115 and the in-operation system check processing device 1 are configured as a single device.

The automatic exploration processing is processing for checking the actual device configuration, connection configuration, software configuration and the like of the in-operation system 5 and, more specifically, is performed using the method described below. First, to perform an exploration, an origin of exploration and an IP address range to be explored must be determined. In this example, it is assumed that the origin of exploration is the ADMIN server 115 of the in-operation system 5. Incidentally, instead of a single location, a plurality of locations may be set as exploration origins. It is assumed that a computer of the server to be the origin is installed with a software program for automatic exploration.

First, a PING command for verifying connectability is issued from the origin server to any device having an IP address on a TCP/IP network in order to detect a presence/absence of a response.

Additionally, for instance, a method may be used in which an agent program for information acquisition is pre-installed on each server that is an exploration object, whereby a request is made from the origin server to the agent program of an exploration object server for individual device information of the exploration object server and information is collected according to the response of the exploration object server. As the agent program, for example, existing software products such as "Server View" by Fujitsu Limited may be used. A server installed with this agent program has a function to return information such as a model of a card that is used as the interface of its own server, an IP address, a MAC address, a model and a version of the installed software and the like to the server that is the information request source.

Furthermore, for example, functions such as SHOW (SH) commands provided in network devices provided by Cisco Systems, U.S.A., may also be used. Examples of usable SHOW commands include "sh hardware", "sh interface" and "sh mac-address-table".

(1) First, in order to determine an address range to be explored by a PING command, the automatic exploration unit 11 references the device table 22 stored in the design data storage unit 20 of the network management DB 2 and obtains information on devices that are automatically explorable and to which IP addresses are assigned. Consequently, as for the example of the device table 22 shown in FIG. 8, in consideration of the upper bound, the lower bound and the like of IP addresses, an IP address range from "192.168.1.0/24" to "192.168.2.0/24" is determined as the exploration range.

(2) The automatic exploration unit 11 sends a PING command to all IP addresses in the determined range of "192.168.1.0/24" to "192.168.2.0/24", and creates a list of responding IP addresses.

(3) Next, based on the created IP address list, the automatic exploration unit 11 inquires devices that have responded for individual device information using a function of an agent program such as the aforementioned "Server View". In response thereto, if the inquiry destination device is equipped with an agent program such as "Server View", information such as a model and a version of the server, a host name, a MAC address, a model of an NIC card built into the server, a model and a version of software, and the like is returned. When the inquiry destination device is not a server, since no responses are made to the information inquiry, the IP address is identified to be other than a server equipped with an agent program.

(4) Next, with respect to devices that did not respond in (3) above, for example, the above-mentioned commands "sh hardware" and "sh interface" are issued. Accordingly, information such as a host name, a model and a function, optional information, a MAC address containment relationship may be obtained from devices corresponding to these commands.

(5) Then, the above-mentioned "sh mac-address-table" is issued to devices identified as HUBs in (4) above. Since a HUB corresponding to this command returns a list of port numbers and a MAC address detected for each port, connection relationships between the port numbers and the HUBs may be grasped.

Incidentally, there may be cases where different exploration commands must be used for network devices of different venders. Such a case may be handled by using, for instance, a method in which a plurality of exploration programs corresponding to the respective network device vendors are prepared in advance and necessary information is collected from the respective devices by using the exploration programs in turn.

Figure 16:
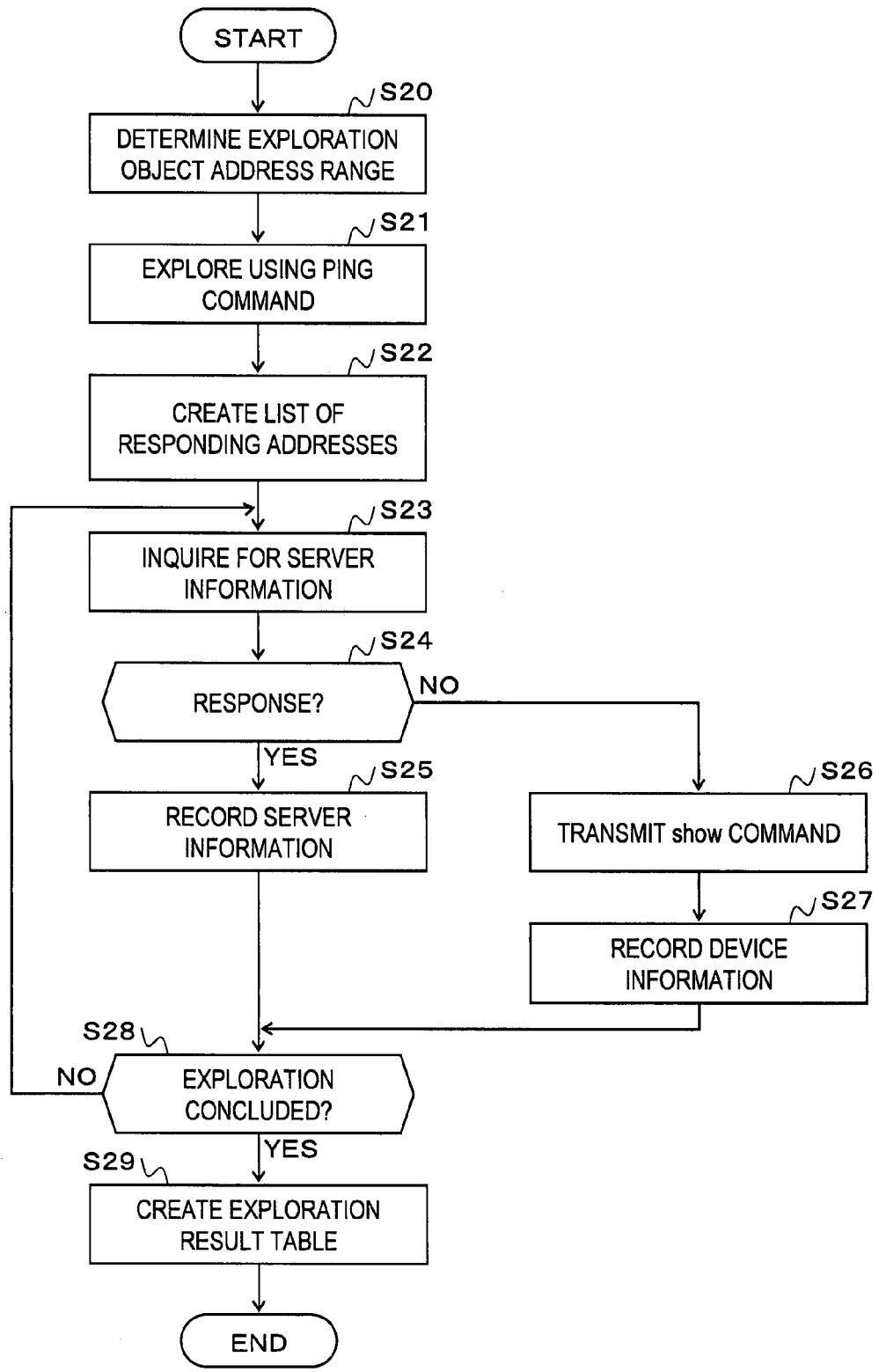
FIG. 16 is a processing flowchart of automatic exploration according to the present embodiment.

FIG. 16 is a processing flowchart of automatic exploration according to the present embodiment. The automatic exploration unit 11 of the in-operation system check processing device 1 determines an address range to become an automatic exploration object from the device table 22 (step S20). Exploration is performed using a PING command on the determined address range (step S21), and a list of responding addresses is created (step S22).

Next, the automatic exploration unit 11 sequentially extracts one address at a time from the list of responding addresses, and inquires for server information (step S23). When there is a response to the server information inquiry (step S24), server information is recorded (step S25). When there are no responses to the server information inquiry, a show command is transmitted (step S26), and the obtained device information is recorded (step S27).

Confirmation is made on whether exploration of all addresses in the address list has been performed (step S28), and if not, the processing of steps S23 to S28 are repeated until processing is concluded.

When exploration has concluded in step S28, the automatic exploration unit 11 creates an exploration result table from information obtained through the processing of steps S20 to S28 (step S29), and concludes processing.

Figure 17:
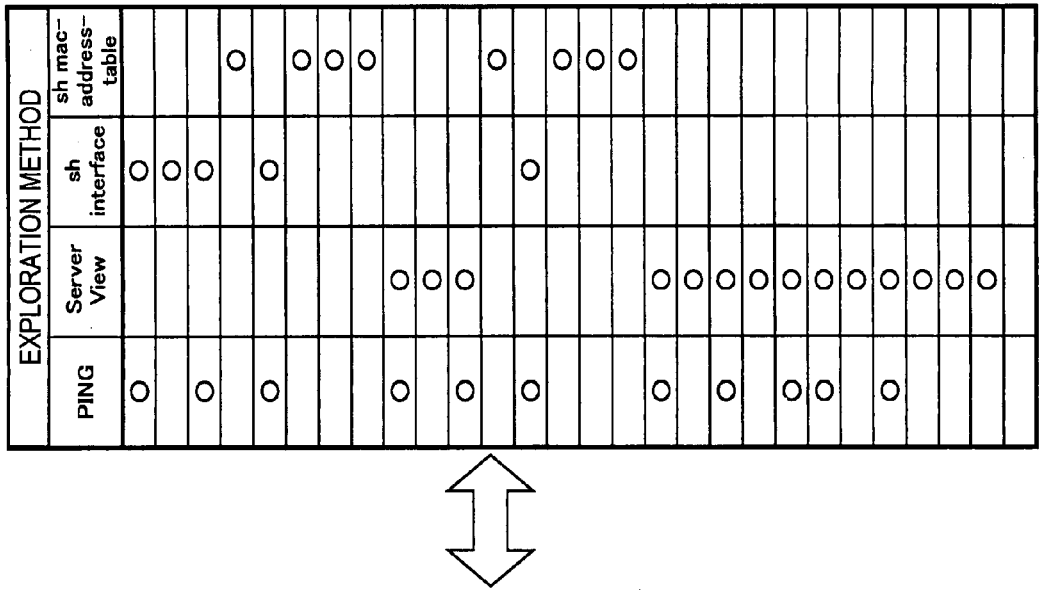
FIG. 17 is a diagram explaining device information obtained through automatic exploration.

FIG. 17 is a diagram explaining device information obtained through automatic exploration. FIG. 17 shows which exploration method is used to obtain information of which device. Moreover, the numbers in the device list shown in FIG. 17 are added for ease of description, and correspond to the management object IDs of the device table 22 shown in FIG. 8.

In addition, FIG. 18 is a diagram explaining information on relationships between devices obtained through automatic exploration. FIG. 18 shows which exploration method is used to obtain information on which relationship. The numbers in the relationship list shown in FIG. 18 correspond to the numbers of the relationship list table 24 shown in FIG. 9.

In step S21 of the flowchart shown in FIG. 16, a device to which an IP address is assigned responds to a PING command to the assigned IP address. As a result, the device to which the IP address is assigned is extracted. In FIG. 17, the devices to which circles are affixed to the "PING" field as an exploration method are network devices that responded to a PING command.

In step S23 of the flowchart shown in FIG. 16, the automatic exploration unit 11 performs an inquiry for server information to devices that responded in step S21. As a result of this inquiry for server information, information such as a model, a host name, a MAC address and the like of devices to which circles are affixed to the "Server View" field as an exploration method in FIG. 17 may be obtained.

In addition, in step S26 of the flowchart shown in FIG. 16, by transmitting a show command such as "sh interface" and "sh mac-address-table" to devices for which information was not acquired in step S23, the automatic exploration unit 11 is able to obtain information such as a model, a function, a MAC address, a port number and the like of devices to which circles are affixed to exploration method fields corresponding to the respective commands in FIG. 17. Consequently, connection relationships between port numbers and HUBs may be grasped.

FIG. 19 is a diagram showing an example of a device exploration result table obtained through automatic exploration. A device exploration result table 28 is a table of information obtained through automatic exploration on the respective devices constituting the in-operation system 5. The numbers in the device exploration result table 28 shown in FIG. 19 correspond to the management object IDs of the device table 22 shown in FIG. 8. This is a table created from the information in the device list obtained using the exploration method described with reference to FIG. 17 and the like.

FIG. 20 is a diagram showing an example of a relationship exploration result table obtained through automatic exploration. A relationship exploration result table 29 is a table of information obtained through automatic exploration and which indicates relationships between the respective devices constituting the in-operation system 5. The numbers in the relationship exploration result table 29 shown in FIG. 20 correspond to the numbers of the relationship list table 24 shown in FIG. 9. This is a table created from information on software installed on a server or information on the connection relationships between port numbers and HUB obtained using the exploration method described with reference to FIG. 17, FIG. 18 and the like.

FIG. 21 is a diagram explaining a comparison check between design data in a network management DB and an automatic exploration result of an in-operation system. FIG. 21A is an example of topological data created from design data, and FIG. 21B is an example of topological data created from an automatic exploration result. In particular, the examples shown in FIGS. 21A and B represent topological data having a data format that focuses on the software installed on the servers.

Comparing the topological data of FIG. 21A and the topological data of FIG. 21B, data of No. 19 exists in the design data of FIG. 21A but not in the automatic exploration result of FIG. 21B. In other words, while design data shows that software whose model is apl4 is to be installed on a server whose host name is ADMIN, the software apl4 is not installed on the ADMIN server of the actual in-operation system 5. Therefore, it is revealed that, in the in-operation system 5, there is an omission of installation of software named "apl4" to a server named ADMIN.

In addition, while the version of software whose model is "db-soft" is "1" in No. 16 in FIG. 21A, the version of software whose model is "db-soft" is "2" in No. 16 in FIG. 21B. Accordingly, it is revealed that "db-soft" in the in-operation system 5 has been upgraded from version "1" to version "2".

By such comparisons between design data and an automatic exploration result, omissions, changes and the like in the configuration of the in-operation system 5 may be automatically detected.

The in-operation system check processing device 1 performs a comparison check between data obtained by merging design data in the network management DB 2 with an automatic exploration result of the in-operation system 5 and the black/white list 30 in the check list storage unit 3, and extracts potentially problematic devices or combinations of potentially problematic devices in the in-operation system 5. A check using the black/white list 30 will now be described with reference to FIGS. 22 to 25.

FIGS. 22 to 24 are diagrams explaining a merge of design data in the network management DB 2 and an automatic exploration result of the in-operation system 5. FIG. 22 shows an example of topological data obtained from design data and which particularly focuses on communication between applications. FIG. 23 shows an example of topological data of an automatic exploration result and which particularly focuses on communication between applications in the in-operation system 5. FIG. 24 is a diagram showing an example of data obtained by merging topological data of design data and topological data of an automatic exploration result.

The merge result data shown in FIG. 24 is obtained by merging the design data shown in FIG. 22 and the automatic exploration result shown in FIG. 23. In this case, for records in which design data differ from automatic exploration result data, automatic exploration result data takes precedence. However, data in design data is appropriated for data that does not exist in an automatic exploration result but exists in design data. This is due to the fact that not all data in design data is necessarily obtained through automatic exploration.

For example, by comparing the design data shown in FIG. 22 with the automatic exploration result shown in FIG. 23, it is found that destination applications (application version numbers) in records No. 4 and No. 5 differ between the two data. In this case, as indicated by the merge result shown in FIG. 24, automatic exploration result data takes precedence.

In addition, by comparing the design data shown in FIG. 22 with the automatic exploration result shown in FIG. 23, it is found that source hardware models and hardware versions in records No. 1 and No. 2 differ between the two data. However, as shown in FIG. 23, no data exists in the source hardware models and hardware versions in records No. 1 and No. 2 of the automatic exploration result. Therefore, in the merge result shown in FIG. 24, data of the design data shown in FIG. 22 is used as the data of the source hardware models and hardware versions in records No. 1 and No. 2.

Figure 25:
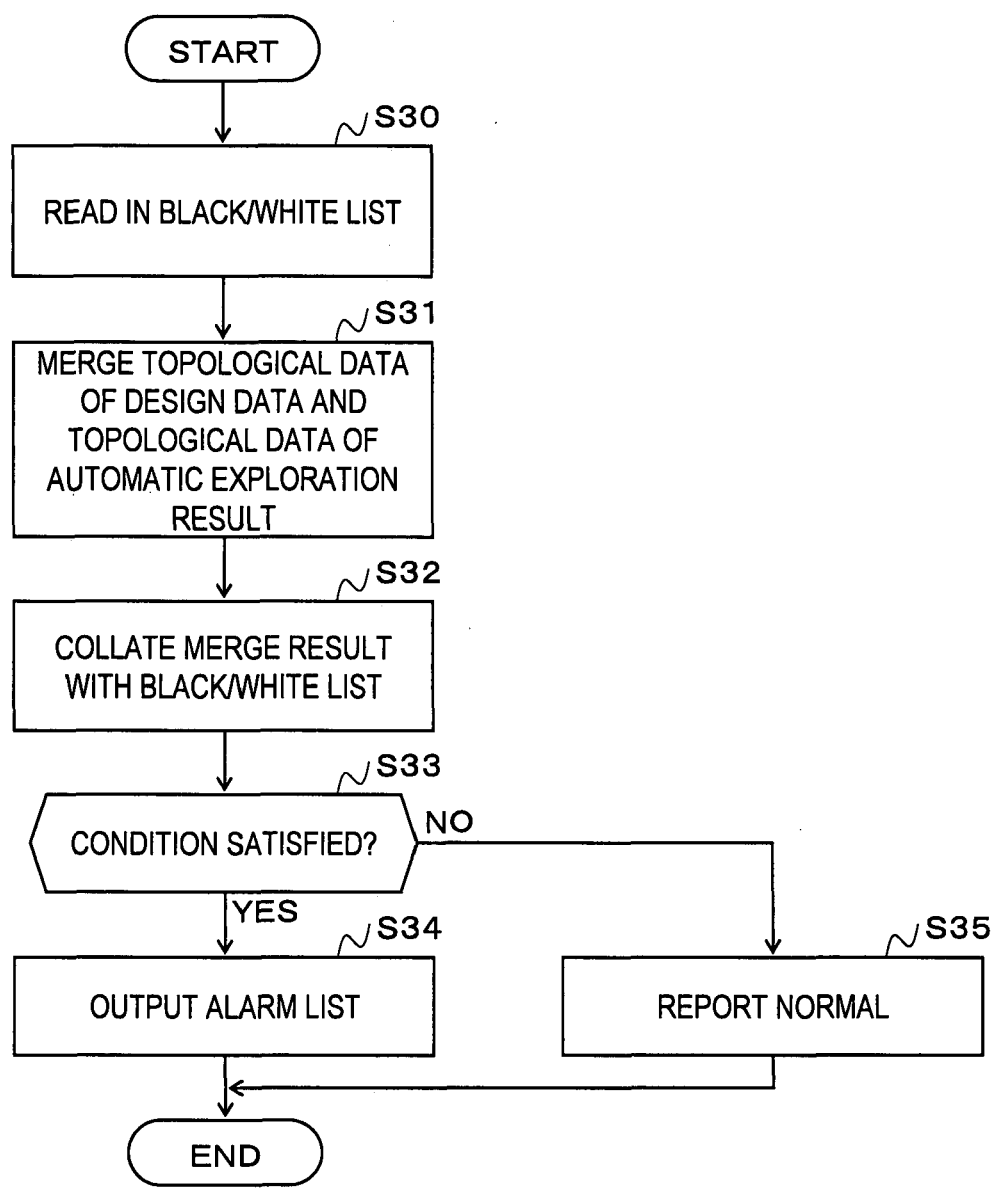
FIG. 25 is a check processing flowchart based on a black/white list according to the present embodiment.

FIG. 25 is a check processing flowchart based on a black/white list according to the present embodiment. The system check unit 15 reads in the black/white list 30 from the check list storage unit 3 (step S30).

The system check unit 15 acquires design data from the design data storage unit 20 of the network management DB 2 and an automatic exploration result from the automatic exploration result data storage unit 21, and merges the topological data of the acquired design data and the topological data of the acquired automatic exploration result (step S31).

The merge result of step S31 is collated with the black/white list 30 read in step S30 (step S32), and a check is performed on whether there are items in the merge result which satisfy the condition in the black/white list 30 (step S33).

If there are items that satisfy the condition, the caution information output unit 16 outputs an alarm list of items that satisfy the condition to the output device 4 (step S34). If there are no items that satisfy the condition, the caution information output unit 16 outputs a normal report to the output device 4 (step S35).

A check using the black/white list 30 as described above enables automatic extraction of potentially problematic devices, software, or combinations thereof in the in-operation system 5.

For example, with respect to the check condition of list No. 1 in the black/white list 30 shown in FIG. 14, by collating this condition with the automatic exploration result shown in FIG. 21B, it is revealed that there is no problem with the server whose model is "SVR2" since the application "apl3" has not been installed.

As for the check condition of list No. 2 in the black/white list 30, by collating this condition with the automatic exploration result shown in FIG. 21B, it is revealed that version "2 (ver. 2)" of the application "apl2" is currently installed on the WWW2 serve (model SVR2) of the in-operation system 5 and that an instability problem exists. From the recommendation item of this check condition, a message to the effect that upgrade of the application "apl2" to version "3 (ver. 3)" is required is outputted as caution information.

As for the check condition of list No. 3 in the black/white list 30, by collating this condition with the result data of FIG. 24 showing a current system status, it is revealed that the software, namely, "db-soft ver. 2" installed on the DB server of the in-operation system 5, has a serious problem of failure due to overload. In addition, since the DB server is used in the business processing A having a high importance, a message that warns urgent upgrade to "db-soft ver. 3" is outputted as caution information.

As for the check condition of list No. 4 in the black/white list 30, by collating this condition with the result data of FIG. 24 showing a current system status, it is revealed that the software "apl1" installed on the WWW1 server of the in-operation system 5 has a serious problem of failure due to continuous operation. In addition, since the server is also used in the business A having a high importance, a message that warns of an urgent need to reboot daily is outputted as caution information.

As for the check condition of list No. 5 in the black/white list 30, by collating this condition with the automatic exploration result shown in FIG. 21B, it is revealed that essential software "apl4" is not installed on the ADMIN server whose model is "SVR1" and a low-importance problem of disabled self-monitoring exists, and a message to this effect is outputted as caution information. This caution information enables the operation manager of the system to determine that, for example, since monitoring business has a low importance, a response thereto during regular maintenance shall suffice.

The above-described processing for checking the in-operation system 5 by the in-operation system check processing device 1 may be achieved by a computer and a software program. The program may be recorded onto a computer-readable storage medium and may also be provided via a network.

The present invention enables a system to remove, in advance, causes of occurrences of failure in an in-operation system by comparing information on a substantiation of a networked computer system that is actually in operation with check conditions of problems primarily discovered after commencement of operation, and can improve operational quality of the in-operation system.

What is claimed is:

1. An in-operation system check processing device, comprising:
    a design data storage unit for storing design data of devices to constitute a network system and a connection and a containment relationship to be realized between the devices in the network system;
    a check list storage unit for storing check conditions that indicate an actually or potentially problematic device and a connection relationship of devices and a containment relationships of devices and caution information thereof;
    an automatic exploration unit for determining an exploration range of addresses of devices in the network system which actually are in operation based on the design data, identifying devices that exist in the exploration range, identifying a connection relationship or a containment relationship among the identified devices based on the design data, and outputting automatic exploration result data which includes the identified devices and the identified connection and identified containment relationships;
    an automatic exploration result data storage unit for storing the output automatic exploration result data;
    a system check unit for detecting, based on the automatic exploration result data and the check conditions, a device corresponding to the device or a combination of devices corresponding to one of the relationships in the check conditions; and
    a caution information output unit for outputting caution information related to the detected device and combination.

2. The in-operation system check processing device according to claim 1, wherein
    the system check unit further collates a merge result of automatic exploration result data stored in the automatic exploration result data storage unit and the design data with check conditions stored in the check list storage unit by using design data stored in the design data storage unit in order to detect devices or combinations thereof corresponding to the check conditions.

3. The in-operation system check processing device according to claim 1, further comprising:
    an exploration result check unit for detecting devices existing in design data but not in automatic exploration result data and devices existing in automatic exploration result data but not in design data by collating design data stored in the design data storage unit with automatic exploration result data stored in the automatic exploration result data storage unit; and
    a check result output unit for outputting information on check results of the exploration result check unit.

4. The in-operation system check processing device according to claim 1, wherein
   design data stored in the design data storage unit and automatic exploration result data stored in the automatic exploration result data storage unit include information on software programs installed on computers included in the network system as well as information on communication performed between the software programs, and
   check conditions stored in the check list storage unit include information on problems in the communication performed between the software programs.

5. The in-operation system check processing device according to claim 1, wherein
   check conditions stored in the check list storage unit include information indicating importance of the impact of an occurrence of a problem on services provided by the system.

6. A method of in-operation system check processing, comprising:
   determining an exploration range of addresses of devices in a network system which actually are in operation based on design data related to device to constitute the network system and to a connection and containment relationships to be realized among the devices in the network system;
   identifying devices that exist in the exploration range;
   identifying a connection relationship or a containment relationship among the identified devices based on the design data;
   outputting automatic exploration result data which includes the identified devices and the identified connection and containment relationships among the identified devices;
   storing the output automatic exploration result data;
   detecting, based on the automatic exploration result data and check conditions that indicates an actually or potentially problematic device, a connection relationship of devices and a containment relationship of the devices and caution information thereof, a device corresponding to the problematic device or a combination of devices corresponding to one of the relationships; and
   outputting caution information related to the detected device and combination of devices.

7. A non-transitory computer-readable medium storing an in-operation system check processing program for having a computer execute processing for checking a configuration of a network system that connects a plurality of computers by a network, the computer having a data storage unit for storing design data and check conditions, the in-operation system check processing program causing the computer to function as:
   a design data storage unit for storing design data of devices to constitute a network system and a connection and a containment relationship to be realized between the devices in the network system;
   a check list storage unit for storing check conditions that indicate an actually or potentially problematic device and a connection relationship of devices and a containment relationships of devices and caution information thereof;
   an automatic exploration unit for determining an exploration range of addresses of devices in the network system which actually are in operation based on the design data, identifying devices that exist in the exploration range, identifying a connection relationship or a containment relationship among the identified devices based on the design data, and outputting automatic exploration result data which includes the identified devices and the identified connection and identified containment relationships;
   an automatic exploration result data storage unit for storing the output automatic exploration result data;
   a system check unit for detecting, based on the automatic exploration result data and the check conditions, a device corresponding to the device or a combination of devices corresponding to one of the relationships in the check conditions; and
   a caution information output unit for outputting caution information related to the detected device and combination.

* * * * *

UNITED STATES PATENT AND TRADEMARK OFFICE
CERTIFICATE OF CORRECTION

PATENT NO. : 7,734,774 B2
APPLICATION NO. : 11/976621
DATED : June 8, 2010
INVENTOR(S) : Toshiro Okada et al.

Page 1 of 1

It is certified that error appears in the above-identified patent and that said Letters Patent is hereby corrected as shown below:

Title Page, please insert after item 65
-- Related U.S. Application Data
(63)  Continuation of PCT International Application No. PCT/JP2005/007772, filed on April 25, 2005. --

Signed and Sealed this
Fifth Day of July, 2011

David J. Kappos
*Director of the United States Patent and Trademark Office*